No. 787,817. PATENTED APR. 18, 1905.
C. A. ALBRECHT.
LINOTYPE MACHINE.
APPLICATION FILED APR. 27, 1904.

WITNESSES:
Ole Bindiie
a. M. C. Kennedy

INVENTOR
C. A. Albrecht
By P. T. Dodge
ATTY.

No. 787,817. PATENTED APR. 18, 1905.
C. A. ALBRECHT.
LINOTYPE MACHINE.
APPLICATION FILED APR. 27, 1904.

No. 787,817. PATENTED APR. 18, 1905.
C. A. ALBRECHT.
LINOTYPE MACHINE.
APPLICATION FILED APR. 27, 1904.

Witnesses
D. Petri-Palmedo
A. M. E. Kennedy

Inventor
C. A. Albrecht
By his Attorney
P. T. Dodge

Patented April 18, 1905.

UNITED STATES PATENT OFFICE.

CHRISTIAN A. ALBRECHT, OF BERLIN, GERMANY, ASSIGNOR TO MERGENTHALER LINOTYPE COMPANY, A CORPORATION OF NEW YORK.

LINOTYPE-MACHINE.

SPECIFICATION forming part of Letters Patent No. 787,817, dated April 18, 1905.

Application filed April 27, 1904. Serial No. 205,093.

*To all whom it may concern:*

Be it known that I, CHRISTIAN A. ALBRECHT, a citizen of the United States, and a resident of Berlin, Germany, have invented a new and useful Improvement in Linotype-Machines, of which the following is a specification.

My invention has reference to linotype or type-bar machines wherein metal matrices representing the various characters are selected and assembled temporarily in line in the order in which their characters are to appear in print, the composed line momentarily presented to the face of a mold in order to form the characters in relief on the edge of a type-metal slug or linotype cast therein, and, finally, the matrices in the composed line returned through a distributing mechanism to the appropriate channels or guides of the magazine from which they started.

It has reference more particularly to machines of the general organization represented in United States Letters Patent No. 557,000.

The aim of the present invention is to increase the number and variety of characters which may be produced from one machine, to permit ready change from one font or set of matrices to another, to facilitate the combination in print of characters represented by matrices in different fonts, and, finally, to permit convenient and speedy change in such combinations. To this end I provide the machine with two or more independently-removable magazines and combine with them and their matrix-delivering devices a single keyboard or equivalent actuating mechanisms and intermediate devices whereby the keyboard may be caused to effect the delivery of matrices from one magazine or the other at the will of the operator.

My improved keyboard connections are located permanently in the frame of the machine exterior to the magazines, and each connection is adapted to operate the corresponding escapements of two or more magazines, the arrangement being such, however, that either magazine may be removed at will and replaced by another without disturbing the other parts.

In the preferred construction the magazines deliver the matrices from their lower ends through a stationary vertically slotted or channeled guide directly into one series of channels, which conduct the matrices toward the assembling or composing devices. In the fixed channeled guide I mount a series of vertical slides located between the paths of the outgoing matrices and each arranged to receive motion from the key mechanism and to impart motion to the escapements of two or more magazines, the escapements of only one magazine being free to operate at the same time.

The magazines are adapted to be withdrawn endwise from the frame of the machine, and in order to facilitate their disconnection I provide a cam mechanism or equivalent mechanism to move them rearward until the escapement-operating devices are disengaged and the attendant parts left free.

With the magazines one overlying another I combine at the upper end any suitable distributing mechanism for returning the matrices to them, preferably a mechanism such as shown in Letters Patent No. 716,975, whereby the matrices for mixed lines may be returned to the two magazines simultaneously.

While I have represented herein details of construction such as are found to be satisfactory in practice, it is to be understood that the details may be modified at will, provided there is no substantial change in the mode of action.

Referring to the drawings, Fig. 1ª is a front elevation of the machine.

I have limited my drawings as far as possible to the parts forming the subject of the present invention. As to the parts which are not shown or specifically described herein, they may be of the same construction and arrangement as in the Mergenthaler patent, No. 557,000, the commercial Mergenthaler machine as sold in the United States, or of any other approved construction.

Referring to the drawings, A represents the main frame, which may be of any construction adapted to receive the operative parts.

B and B′ represent two inclined channeled magazines supported in the top of the main frame and standing normally at rest. They may each consist, as usual, of two parallel plates fixed at a suitable distance apart and grooved in their inner faces to receive and guide the edges or ears of the metal matrices C. From these magazines the matrices are delivered one at a time at the lower end through corresponding slots or channels $d$ in guide D, secured to the main frame into the front channels E. Descending through this one series of channels E the matrices are all received on the one inclined belt F, whereby they are carried successively downward toward the left into the assembler G, where they are assembled or grouped side by side in a common line, together with wedge spacers or justifiers, which are fed into the line, as usual. The composed unjustified line is transferred by the ordinary mechanism to the face of a slotted mold H, which is mounted in a supporting-wheel and arranged to receive molten metal at suitable intervals from a melting-pot at the rear. From the casting-point the line of matrices is lifted to the top of the machine and the individual matrices returned through the distributing mechanism L M N to the upper ends of the channels in the magazines.

Figures 3, 4, 5:
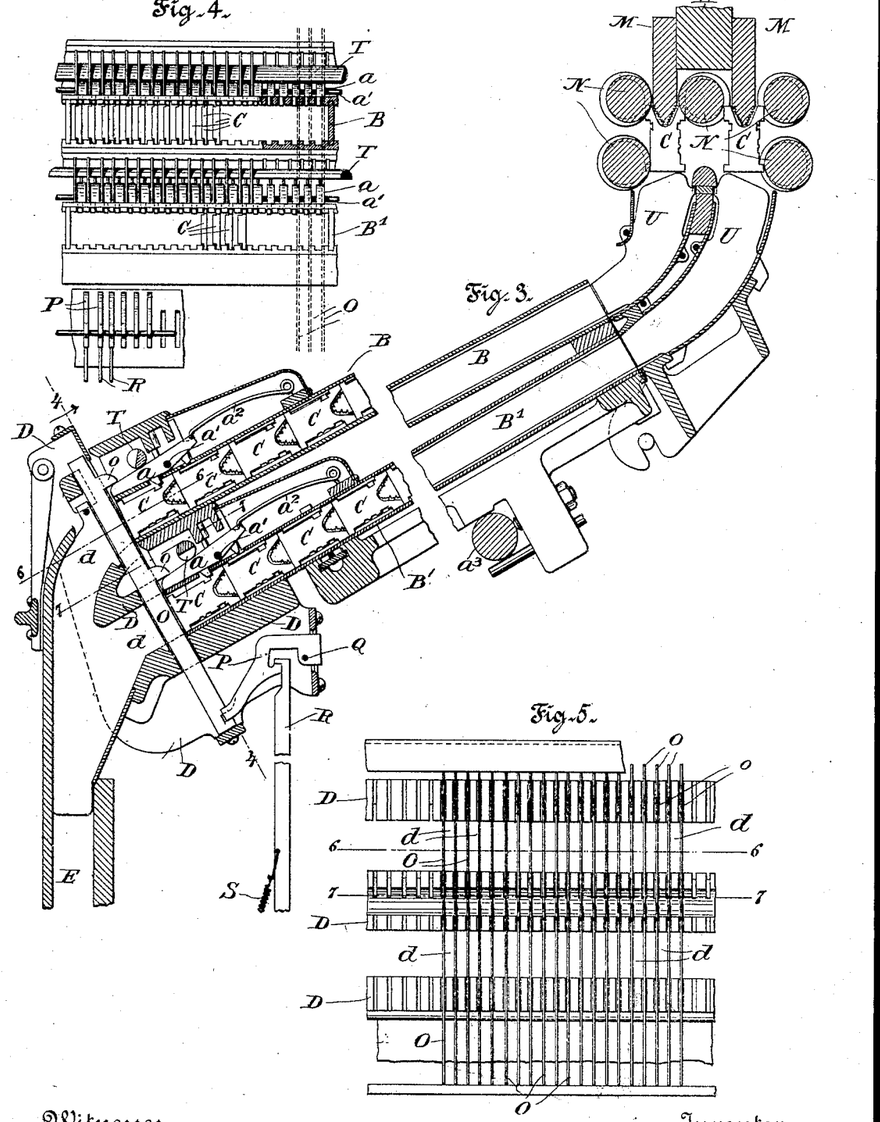
Fig. 3 is a longitudinal vertical section, on a larger scale, through the magazines and adjacent parts on the line 3 3 of Fig. 1ª.
Fig. 4 is a transverse section on the line 4 4 of the preceding figure looking toward the delivery end of the two magazines.
Fig. 5 is a view on the same plane as the preceding view, but looking toward the front of the machine in the direction in which the matrices are delivered.
Figure 6:
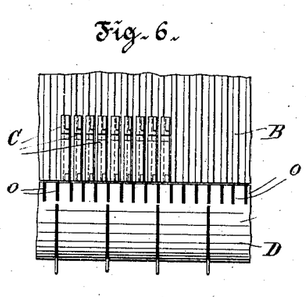
Fig. 6 is a cross-section on the line 6 6 of Figs. 3 and 5 looking downward.
Figure 7:
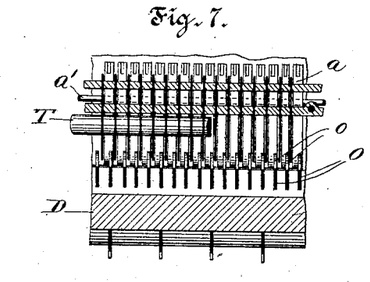
Fig. 7 is a section on the line 7 7 of Figs. 3 and 5.

The first and principal part of my invention has reference to the plurality of magazines and the devices for delivering the matrices therefrom. Each magazine is provided, as shown in Fig. 3, at the lower end with an escapement or matrix-controlling device $a$ for each channel in order to control the delivery of matrices therefrom and permit the escape of but one matrix at a time. The escapements are located on top of the magazines and consist each of a lever mounted on a central horizontal pivot $a'$ and provided with two depending lips, which are projected alternately downward into the magazine in the path of the matrices as the lever is rocked to and fro. A spring $a^2$, fixed to the magazine and bearing on the lever, tends to raise the lower lip of the escapement in order to permit the escape of the lowermost matrix from the magazine; but by means hereinafter described the escapement is held normally in the reverse position with its lower lip depressed, as shown in Fig. 3, so as to retain the lowermost matrix in the extreme end of the magazine, ready for instant delivery when the escapement is released.

The lower end of the escapement-lever terminates near the lower end of the magazine and is widened or extended laterally. The stationary guide D has its channels or openings $d$ arranged to correspond in size and location with the channels of the magazine, so that when a matrix is released it will slide downward through one of the openings in the guide and thence into a corresponding guide or channel E. The upper rear face of the guide D is of suitable form to receive and sustain the lower ends of the magazines, and it is provided in the face adjacent to the magazines with a series of upright slots or grooves adapted to receive the escapement-operating slides O. These slides are located between the matrix-channels or, in other words, between the paths of the outgoing matrices, and each slide is provided with two lips $o$, adapted to overlap the ends of the adjacent escapement-levers $a$, one in the upper and the other in the lower magazine. The slides O are each connected to an operating-lever P, pivoted to the main frame at Q and engaged by a depressing-rod R, which is pulled downward by a spring S sufficiently strong to overcome the influence of the springs $a^2$ in order to hold the escapements normally in the position shown in Fig. 3, as before mentioned.

The rods R will be connected with any ordinary keyboard mechanism, whereby they may be lifted in the order in which the characters of the corresponding matrices are to appear in print. I recommend for the purpose the keyboard mechanism used in the Mergenthaler machine and shown in United States Letters Patent No. 530,931.

In practice it is desirable to deliver the matrices from only one magazine at a time, and I therefore provide means for locking the escapements of one magazine or the other out of action at will. I recommend as the most simple means known to me for the purpose the transverse rock-shafts T T, seated in bearings on the respective magazines and flattened on one side, so that when turned to one position each rod will lock down the entire series of escapement-levers on its magazine and when turned in the opposite direction will leave the escapements free for action.

Figure 1:
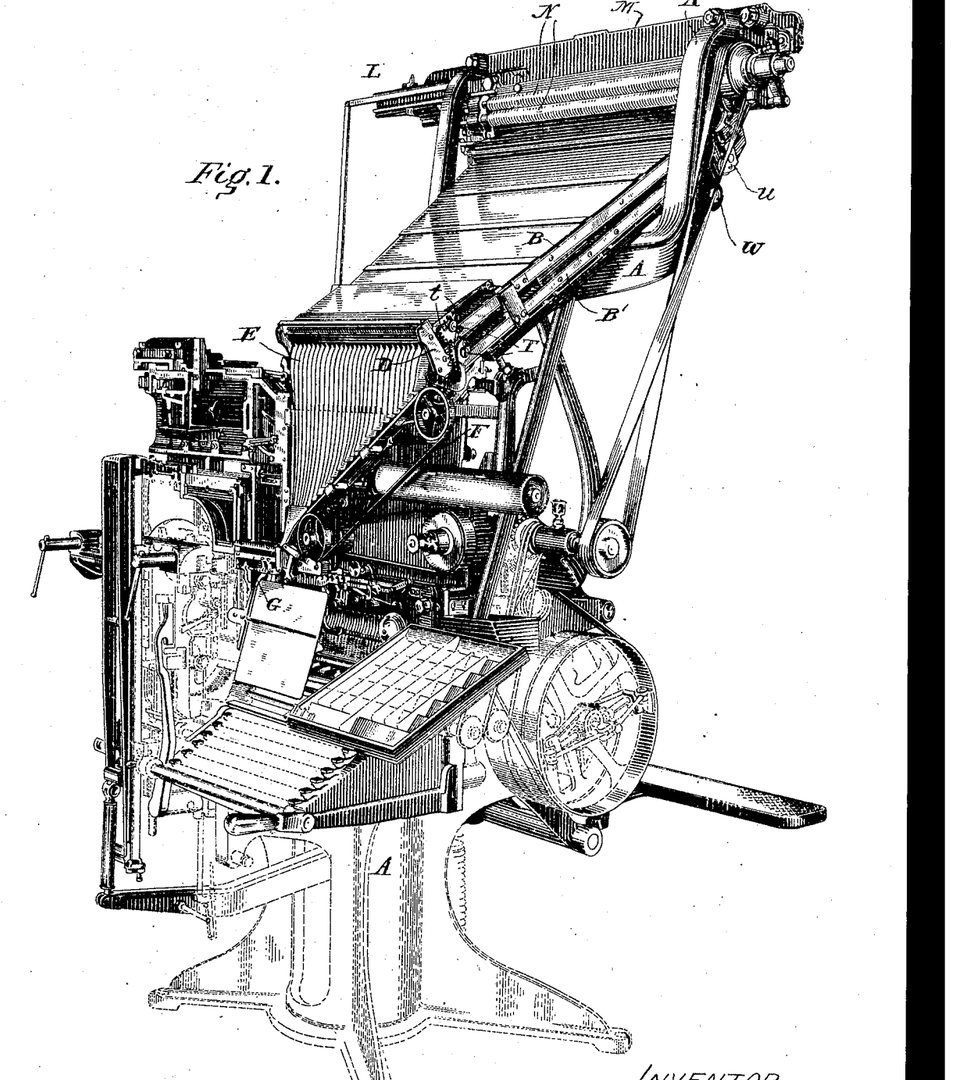
Figure 1 is a perspective view of my machine with two magazines.
Figure 1A:
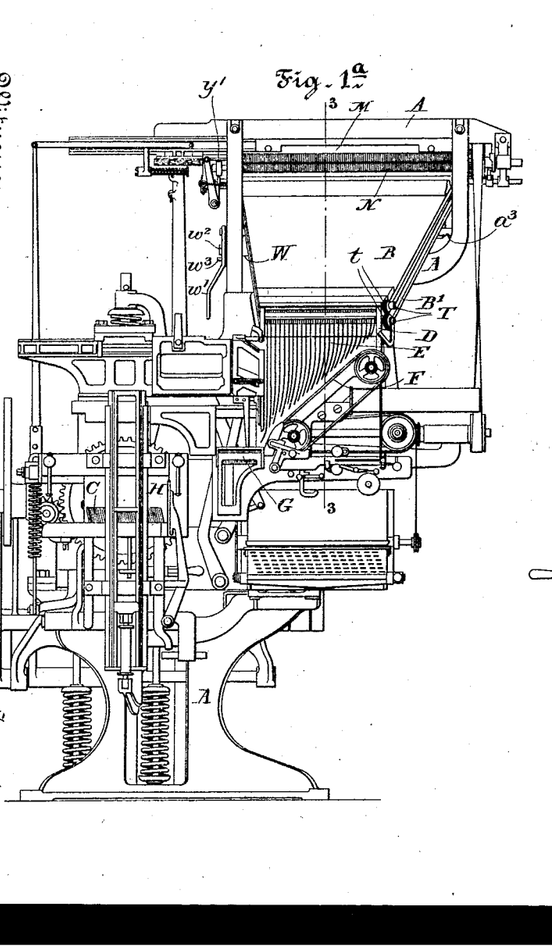
Figure 2:
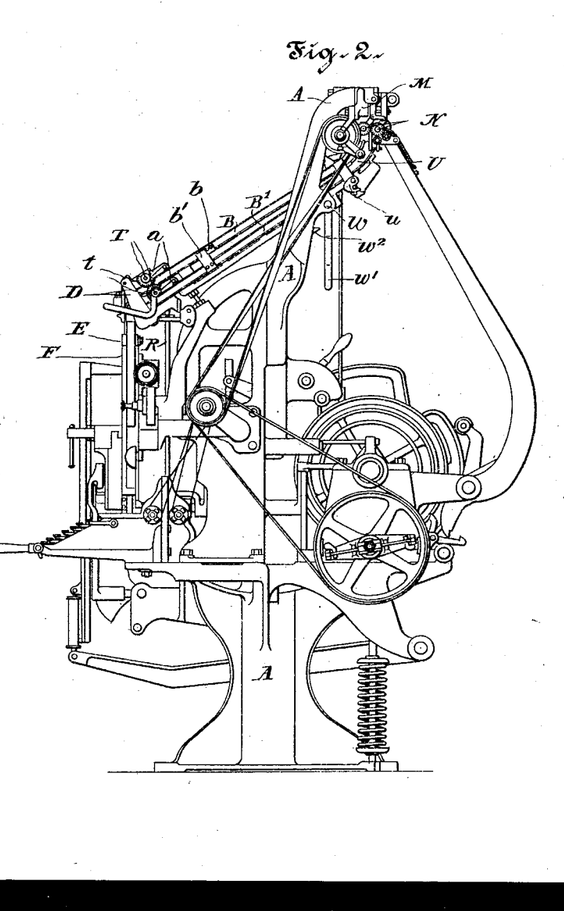
Fig. 2 is a side elevation of the same looking from the right.

In Fig. 3 it will be seen the escapements of the upper magazine are thus locked out of action, while those of the lower magazine are free to operate. The two rock-shafts are connected at one end, as shown in Fig. 1, by gears $t\ t$, so that they always occupy reverse positions, one set of escapements being thus released when the other is thrown into action.

It will be observed that the locking devices O hold the escapements down against the pressure of the springs $a^2$ and that consequently the actuating-springs S and their connections are required to overcome the tension of only one set of springs $a^2$, those connected with the escapements which are for the time being in action. This permits the springs S and all the connecting parts to be made lighter than would otherwise be necessary and gives the keyboard and escapement devices a smooth easy action.

It will be perceived that under my organization the entire keyboard mechanism and the connecting parts may remain in position in the main frame and that there is no occasion for disturbing their relations or interrupting their connections when removing or replacing the magazines. As each magazine is separately removable from the machine and carries with it the escapements or matrix-releasing devices, the exchange of magazines may be quickly made without disturbing the other parts and, indeed, the change of one magazine may be effected while the other is in action.

The details of the escapement devices and the details of their operating devices in the main frame may be widely modified without departing from the substance of my invention.

Figures 8, 9:
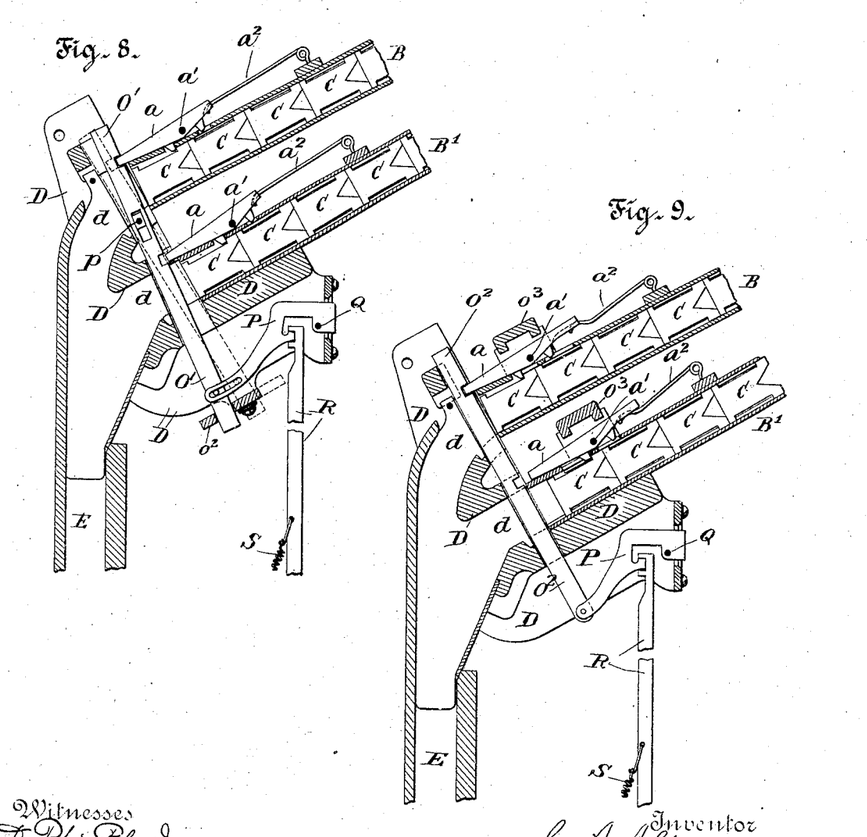
Figs. 8 and 9 are vertical sections through the lower end of the magazines and the adjacent parts in slightly-modified or alternative forms.

In Fig. 8 I have shown an alternative or modified arrangement in which the escapement-operating slides O' are arranged to engage the escapements of one magazine or the other at will. The slots in the stationary frame or guide D are made of such depth that the slide O' may rock edgewise. At a point between the two magazines each slide is slotted longitudinally and arranged to turn and to slide endwise on a transverse pivot $p$. Its lower end is connected by a pin to the slotted actuating-lever P, receiving motion from the finger-key mechanism, as before. The slide O' is provided with two notches to receive the escapement-levers of the upper and the lower magazine, respectively. When rocked to the position shown in full lines in Fig. 8, the slide will engage the escapements of the upper magazine and operate the same in the ordinary manner without affecting or being affected by the escapements of the lower magazine. On the contrary, if the slide is rocked about the guide-pin $p$ to the position shown in dotted lines it will be disengaged from the escapements of the upper magazine and engaged with those of the lower magazine in order to impart motion thereto. A movable guide-bar $o^2$, attached to the frame, will serve as a means of shifting all the slides from one position to the other. The guide $o^2$ or its equivalent may be connected with any suitable operating or adjusting devices.

In Fig. 9 I have shown a construction in which a series of escapements on the magazines are adjustable lengthwise of the latter to cause their engagement or disengagement with the operating-slides $O^2$. In this case all the escapements for one magazine are pivoted in a slotted sustaining-bar $o^3$, having a sliding connection with the magazine, so that it may be moved forward or backward. The operating-slides $O^2$ are notched to engage the ends of the escapement-levers. When the matrices are to be delivered into either magazine, its escapements are pushed downward into operative position until they engage the slides $O^2$, while the escapements of the other magazine are moved upward out of engagement, as shown in Fig. 9. In this figure it will be seen that the escapements of the upper magazine are operative, while those of the lower magazine are disengaged and inoperative.

The location of the escapements in the upper instead of the lower side of the magazines is advantageous in that the dust and dirt will have no tendency to accumulate in them, in that continuous uninterrupted grooves are permitted in the lower plate from one end to the other to guide the matrices, and in that any slight inequality in the wear, movement, or adjustment of the escapement-pawls is prevented from affecting the proper delivery of the matrices.

The magazines may be independently supported in the main frame in any suitable manner, and they are adapted for independent removal. I prefer to sustain the forward end of the lower magazine on the fixed guide D, which forms a part of the main frame and which is of L form in cross-section, as shown in Figs. 3, &c., so that it extends beneath as well as across the end of the magazine. At the top the magazine may rest upon the usual rod $a^3$ in the main frame. The upper magazine is separated from the lower by means of distance-pieces, and it may be sustained thereby; but it is preferred to give it independent supports or bearings in the main frame, thus permitting the lower magazine to be withdrawn without disturbing the upper one.

Figure 10:
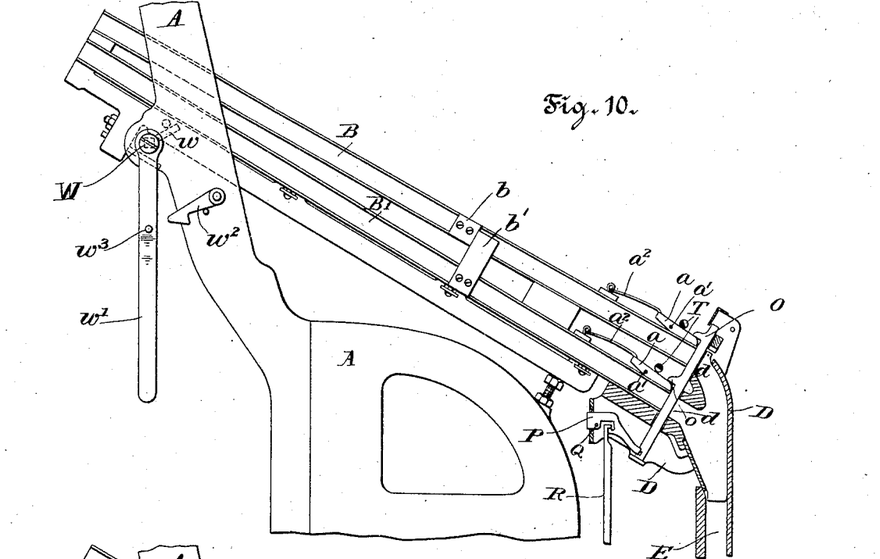
Fig. 10 is a side elevation showing in outline means for shifting the two magazines endwise preparatory to their removal.
Figure 11:
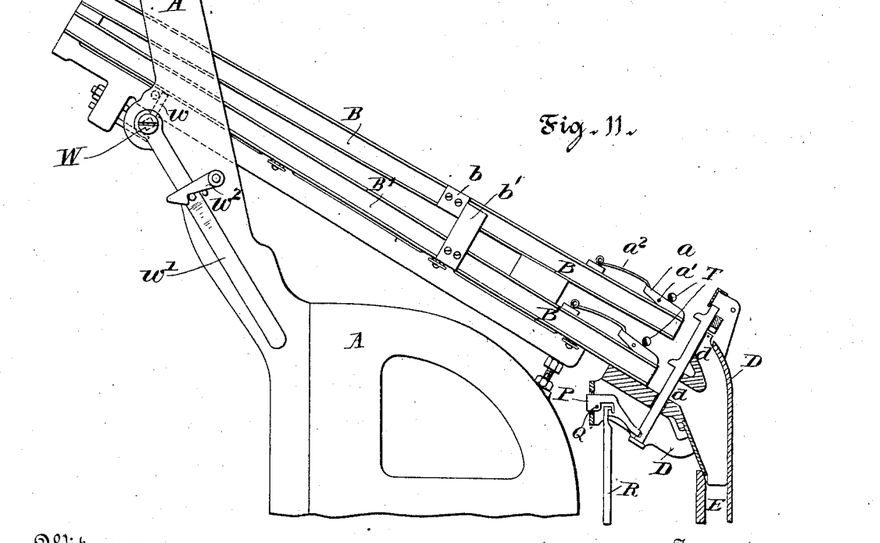
Fig. 11 is a similar view showing the magazines shifted to disconnect their escapements from the operating devices preparatory to removal.

Before the magazines are removed it is desirable that they should be moved endwise in a rearward direction to disengage the escapements from the operating devices. This may be conveniently effected, as shown in Figs. 10 and 11, by seating a rock-shaft W (which may conveniently be the supporting-rod $a^3$) horizontally in the main frame beneath the lower magazine and providing it with arms or projections $w$ to engage pins or equivalents on the lower magazine, so that when the shaft is turned by means of the handle $w'$ on its end the arms will serve to slide the lower magazine upward until it is held by the latch $w^2$, which is pivoted to the side of the main frame and adapted to engage over stud $w^3$ on the handle $w'$. In order to effect the lifting of the upper magazine at the same time and by the same operation, I propose to provide the respective magazines on their sides or edges with ears $b\ b'$, adapted to interlock, as shown, so that when the lower magazine is moved rearward it will carry the other with it.

The magazine B may be provided with a latch or other locking device similar to that used in the lower magazine. It will be observed that the upper magazine after being moved to disengage its escapements may be removed wholly independent of the lower. If the lower magazine is to be removed, the upper magazine should be slightly lifted to disengage the studs $b\ b'$, after which the lower magazine may be independently removed.

The essence of the invention resides in providing any means for moving the magazines rearward to disengage the escapements from the operating devices and in the provision of means in any form for holding the magazines so that they may be conveniently withdrawn by the attendant standing behind the machine, as usual.

It will of course be understood that the magazines may be in any suitable form and that they may be supported in the main frame by any suitable means, these details not being of the essence of the invention.

The magazines are each provided at their upper ends, as shown in Fig. 3, with a channeled throat or guideway U for the purpose of deflecting the matrices received from the distributer above laterally into the proper channels in the magazines. These throats, commonly known as "channel-entrances," are similar to those used in the ordinary Mergenthaler machines, except that they are united or connected as one, their upper ends lying in parallel lines and in position to receive the matrices falling from two independent distributer-bars M, lying one over each throat or entrance. The double or compound channel-entrance is connected to the magazines by latches $u$, as shown in Fig. 1, and is readily detachable whenever a magazine is to be removed from the machine. The two distributer-bars M, lying in parallel lines over the distributer-entrance, are of the type commonly used in the Mergenthaler linotype-machines. The composed lines of matrices are lifted from the casting-point and the matrices are lifted individually from the line and delivered to one distributer-bar or the other that they may be returned to the magazines from which they were discharged.

Figure 12:
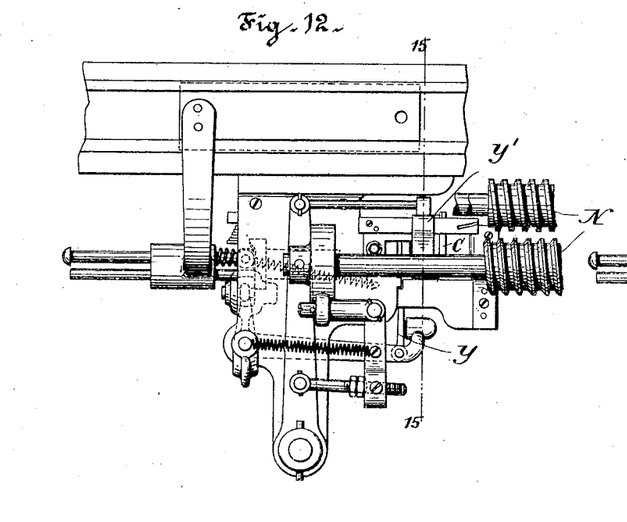
Fig. 12 is a front elevation of the receiving end of the distributing mechanism.
Figure 13:
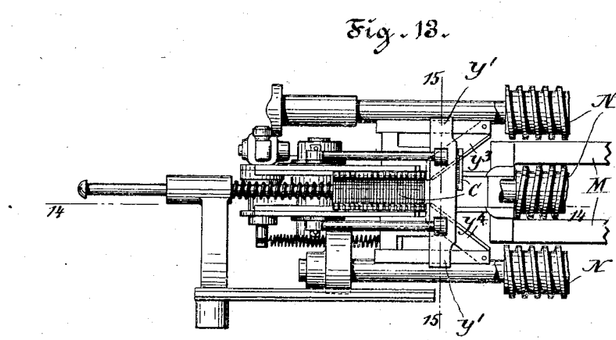
Fig. 13 is a plan view of the same.
Figure 14:
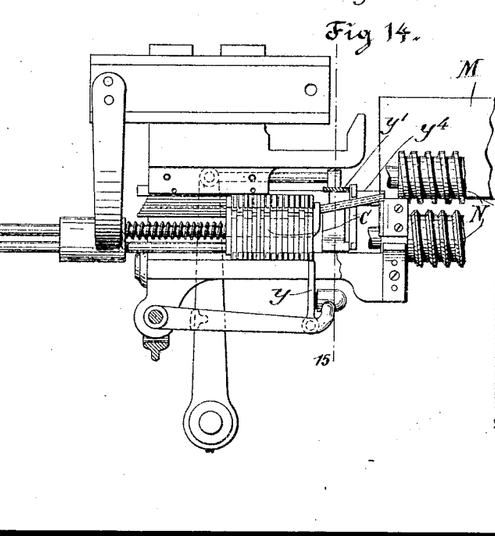
Fig. 14 is an elevation similar to Fig. 12 with the front members removed to expose the internal parts.
Figure 15:
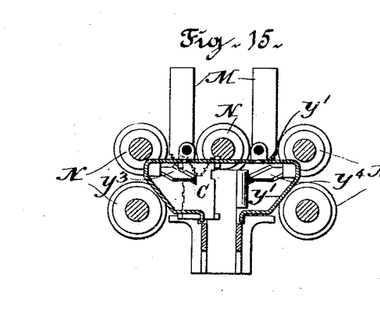
Fig. 15 is a cross-section on the line 15 15, Figs. 12, 13, and 14.

I prefer the distributing mechanism such as shown in Figs. 12, 13, and 14, being in many respects similar to that shown in my Patent No. 716,975. The matrix-line is urged forward horizontally by a pressure or follower device. The vertically-reciprocating finger $y$ lifts the matrices successively into the field of a horizontal reciprocating pusher $y'$, by which they are carried forward along the horizontal diverging separator-rails $y^3$ and $y^4$, having a dovetail form in cross-section. Matrices intended for the upper distributer are notched in one edge to engage the dovetail rail $y^3$, while those for the other distributer are notched to engage rail $y^4$. These rails lead forward toward the ends of the respective distributer-bars M. As a matrix is moved forward by pusher $y'$ it engages rail $y^3$ or $y^4$ and is guided edgewise thereby into a position to engage one distributer-bar M or the other. During this travel the matrix rides on a fixed sustaining-plate below it. The bars M and the matrices are toothed in the ordinary manner, and the matrices are advanced along the bars by the customary feed-screws N until they arrive at the proper points for delivery to their respective magazine-channels.

While I prefer to mount my magazines in an inclined position, as shown, it is understood, of course, that they may be mounted in a vertical position, the other parts retaining their operative relations thereto.

While it is preferred to mount the magazines in substantially parallel planes, as shown, any moderate divergence from this parallelism is non-essential.

It will be observed that under the construction herein shown it is possible to remove one magazine independently of the other, also that the magazine may be removed without disturbing the connection of said devices with the keyboard connections. As the escapement-actuating devices are located in the frame of the machine wholly outside of the magazines, the magazines may be instantly removed and replaced.

The location of the escapements, as shown, at the top of the magazine instead of the bottom is of decided advantage in that it permits smooth, continuous, and uninterrupted grooves or channels in the bottom plate of the magazine, so that there is no danger of the matrices being interrupted in their travel by joints or by escapements which are worn, so that they fail, as in the case of the bottom escapements, to permit the free passage of the matrices.

What I claim as my invention is—

1. In a linotype-machine, a detachable magazine, carrying matrix-releasing devices at its upper side, in combination with a main frame and devices mounted in the latter beyond the end of the magazine for operating the matrix-releasing devices, whereby the operation of said releasing devices is secured without extending them through the magazine and without impeding the removal and replacement of the latter.

2. In a linotype-machine, a plurality of magazines, each provided with matrix-releasing devices, a supporting-frame therefor, and means mounted in said frame beyond the delivery ends of the magazines for operating the releasing devices of one magazine or the other at will.

3. In a linotype-machine, a detachable magazine having a fixed operative position and provided with matrix-releasing escapements on the upper side, a supporting-frame, devices mounted in the frame exterior to the magazine and adapted to operate the escapements, and means for operating said devices from a point below the magazine.

4. In a linotype-machine, a channeled magazine for matrices, a guide channeled for the passage of the outgoing matrices, devices controlling the delivery of the matrices from the magazine, and operating means for said devices located exterior to the magazine and between the paths of the matrices.

5. In a linotype-machine, and in combination, two magazines, one overlying the other and each provided with matrix-delivering devices, a supporting-frame, and means seated in said frame independent of the magazine for actuating the releasing devices whereby the removal of one magazine independently of the other is permitted without disturbance of the actuating devices.

6. In a linotype-machine, magazines B B', one overlying the other, a fixed guide D independent of the magazines, with channels therethrough for the passage of the matrices, escapements in the magazines to control the discharge of matrices, and slides O mounted in the guide D and adapted to operate the escapements, whereby the removal of the magazine is permitted without disturbing the actuating-slides, and one set of slides adapted to actuate the escapements of a series of interchangeable magazines.

7. In a linotype-machine, a removable magazine provided with matrix-delivering escapements, a supporting-frame, means seated in the frame for actuating the escapements, and means for shifting the magazine endwise to effect the disengagement of the actuating devices preparatory to the removal of the magazine.

8. In a linotype-machine and in combination with a removable magazine, a supporting-frame, and a rock-shaft W, adapted to move the magazine endwise.

9. In a linotype-machine and in combination with a magazine removable endwise, means for temporarily holding the magazine in rear of its operative position preparatory to its removal.

10. In a linotype-machine, the two magazines, one overlying the other and each provided with escapements, in combination with a stationary supporting-frame, channeled or slotted for the passage of the outgoing matrices, slides mounted in said frame exterior to the magazine and adapted to actuate the escapements of both magazines, and means for locking the escapements of either magazine at will.

11. In a linotype-machine, the combination of a magazine provided with escapements, a stationary supporting-frame, slides O, mounted in the frame exterior to the magazines and adapted to engage the escapements, slide-operating levers P, springs $a^2$ tending to move the escapements in one direction, springs S tending through the slides O to move the escapements in the opposite direction, means for moving the slides, means for preventing the escapement of matrices from either magazine at will.

12. In a linotype-machine, the combination of the matrix-magazine and channeled throat or entrance, detachably coupled to its upper end and instantly removable from the machine at will.

13. In a linotype-machine, the two magazines in combination with a double throat or entrance, detachably secured in position and adapted for instantaneous independent removal at will, whereby its removal is permitted preparatory to the removal of either magazine.

In testimony whereof I hereunto set my hand, this 14th day of March, 1904, in the presence of two attesting witnesses.

CHRISTIAN A. ALBRECHT.

Witnesses:
WOLDEMAR HAUPT,
HENRY HASPER.